(12) United States Patent
Kawahara et al.

(10) Patent No.: US 8,526,100 B2
(45) Date of Patent: Sep. 3, 2013

(54) DISPLAY METHOD AND DISPLAY DEVICE

(75) Inventors: Jun Kawahara, Kanagawa (JP); Satoshi Tatsuura, Kanagawa (JP); Kei Shimotani, Kanagawa (JP); Yasuo Yamamoto, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 3 days.

(21) Appl. No.: 13/067,155

(22) Filed: May 12, 2011

(65) Prior Publication Data

US 2011/0216393 A1    Sep. 8, 2011

Related U.S. Application Data

(62) Division of application No. 11/599,409, filed on Nov. 15, 2006, now Pat. No. 7,965,438.

(30) Foreign Application Priority Data

Apr. 11, 2006  (JP) .................................. 2006-109156

(51) Int. Cl.
G02B 26/00  (2006.01)
G02B 26/08  (2006.01)
G02F 1/29   (2006.01)

(52) U.S. Cl.
USPC ......................................... 359/296; 359/298

(58) Field of Classification Search
USPC ................. 359/290–292, 295, 296, 237, 298, 359/242
See application file for complete search history.

(56) References Cited

U.S. PATENT DOCUMENTS

| | | | |
|---|---|---|---|
| 5,764,401 A | | 6/1998 | Udaka et al. |
| 6,985,223 B2* | | 1/2006 | Drachev et al. ............... 356/301 |
| 7,483,014 B2* | | 1/2009 | Tanaka et al. ................. 345/105 |
| 7,666,049 B2 | | 2/2010 | Saito et al. |
| 2005/0104136 A1* | | 5/2005 | Edwards et al. ............... 257/400 |
| 2006/0272948 A1* | | 12/2006 | Yamamoto et al. ............. 205/52 |

FOREIGN PATENT DOCUMENTS

| | | |
|---|---|---|
| JP | A-8-262501 | 10/1996 |
| JP | A 2000-338528 | 12/2000 |
| JP | A 2003-131339 | 5/2003 |
| JP | A 2003-170627 | 6/2003 |
| JP | A 2004-18549 | 1/2004 |
| JP | A 2004-198451 | 7/2004 |
| JP | A-2005-17907 | 1/2005 |
| JP | A 2005-92183 | 4/2005 |

OTHER PUBLICATIONS

Sep. 20, 2011 Japanese Office Action issued in Japanese Patent Application No. 2006-109156 (with translation).

* cited by examiner

Primary Examiner — Thomas K Pham
Assistant Examiner — Brandi Thomas
(74) Attorney, Agent, or Firm — Oliff & Berridge, PLC

(57) ABSTRACT

The invention provides a display method for displaying an image by deposition of metal fine particles. The display method includes at least depositing metal fine particles, from an electrolytic solution that has at least a metal ion of the metal fine particles and that is provided between a pair of substrates having at least one translucent substrate, onto a surface of any one of the pair of substrates by imparting one stimulus. A concentration of the metal ion of the metal fine particles in the electrolytic solution after imparting the stimulus is about 200 mmol/l or less. The invention further provides a display device which uses the display method.

12 Claims, 1 Drawing Sheet

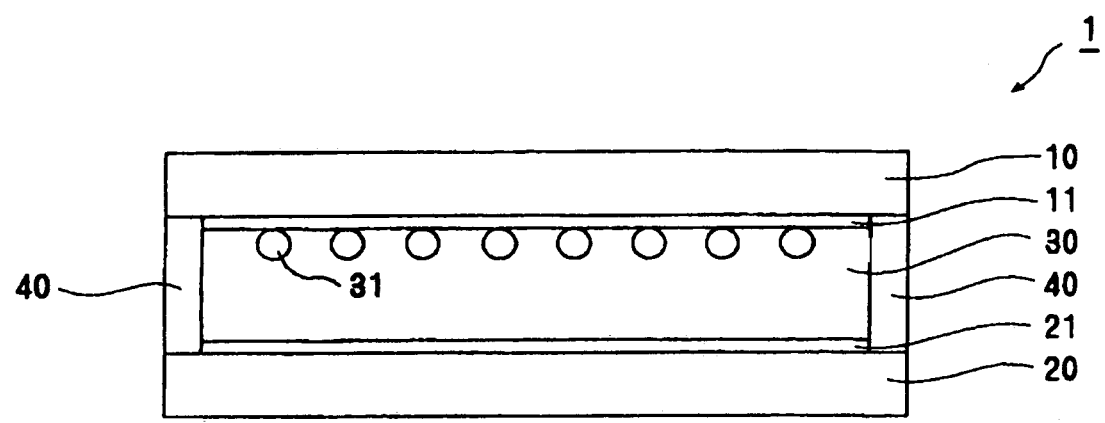

DISPLAY METHOD AND DISPLAY DEVICE

This is a Division of application Ser. No. 11/599,409 filed Nov. 15, 2006, which claims priority to Japanese Patent Application No. 2006-109156 filed Apr. 11, 2006. The disclosure of the prior applications are hereby incorporated by reference herein in their entirety.

BACKGROUND

1. Technical Field

The present invention relates to a display method and a display medium. The present invention particularly relates to a display method and a display medium that are suitable for utilizing for an electronic paper and the like.

2. Related Art

Along with the advancement of computerization in recent years, the amount consumed of paper as a communication medium is continuing to increase. However, as a medium for replacing paper, electronic paper, an image display medium with which recording and deleting an image can be repeated is gathering attention to. In order to put the electronic paper to use in practice, it is required that the electronic paper, as portable, lightweight and not bulky (thin) as paper, requires little energy for rewriting, and has high reliability with little deterioration with repeated rewriting.

Further, although visibility of the electronic paper is required to be similar to that of paper, it has been difficult to realize the electronic paper because there are the following problems in conventional techniques:

(1) liquid crystal method: since a deflecting plate is used therein, light usage efficiency is low and a reflection coefficient is decreased;

(2) twist ball method: due to an imperfect black-and-white hemisphere state, a contrast and a reflection coefficient are hindered; and (3) electrophoretic method: due to an imperfect change-over of particles of different colors, light leakage between particles, and a specific electrode constitution, a contrast and a reflection coefficient are hindered.

Display technologies that are suitable for use in such a display medium include methods in which display is carried out by depositing and dissolving metals such as silver through application of electric fields or light irradiation utilizing an electrolyte like a silver salt solution, and methods in which display is carried out by utilizing organic photochromic materials such as fulgides.

However, the method utilizing the electrolytic solution is basically for a black-and-white display and, for a color display, it is necessary to use a color filter. Accordingly, there is a problem in that, in a reflection-type display medium, usage efficiency of light comes to be about one third and the display is darkened. Further, in the method using the photochromic material, there is a problem in that a sufficient density of developed color can not be obtained.

SUMMARY

In a case where a metal ion is deposited from an electrolytic solution containing a metal ion and a particle diameter of the thus-obtained deposited material is controlled so that surface plasmon resonance is generated to perform a multi-color display, it is thought that degree of whiteness (white reflection coefficient) of the background portion in the display and the color purities of colors shown by the display are liable to be deteriorated.

The invention provides a display method and a display medium which can achieve both of high white reflection coefficient and color display without using a color filter.

According to an aspect of the invention, a display method for displaying an image by deposition of metal fine particles, the display method comprises depositing metal fine particles, from an electrolytic solution that comprises the metal ion of the metal particles and that is provided between a pair of substrates comprising at least one translucent substrate, onto a surface of any one of the pair of substrates by imparting one stimulus, a concentration of the metal ion of the metal fine particles in the electrolytic solution after imparting the stimulus being about 200 mmol/l or less.

BRIEF DESCRIPTION OF THE DRAWING

FIG. 1 is a schematic sectional view showing one example of a display device according to an exemplary embodiment of the present invention.

DETAILED DESCRIPTION

Hereinafter, detailed explanations of the invention are provided.

The display method of the invention is a method for displaying an image by deposition of metal fine particles. The display method includes at least depositing metal fine particles, from an electrolytic solution that contains at least the metal ion of the metal particles and that is provided between a pair of substrates including at least one translucent substrate, onto a surface of any one of the pair of substrates by imparting one stimulus. A concentration of the metal ion of the metal fine particles in the electrolytic solution after imparting the stimulus being about 200 mmol/l or less.

The display device of the invention is a device that uses the display method of the invention. Since the display method and the display device have a common basic configuration, explanations thereof are simultaneously provided in the followings.

The display method of the invention displays an image by utilizing color due to surface plasmon resonance of metal fine particles deposited on a surface of a solid from an electrolytic solution. Since many of the metal ions show colors in forms of complexes in the electrolytic solution, due to the thus-exhibited colors, degree of whiteness and color-purities of colors are liable to be deteriorate. In consideration of these problems, the present inventors have found a display method capable of depositing the metal fine particles by setting a concentration of a metal ion contained in the metal fine particles in the electrolytic solution which become a cause of such coloring as described above to be even less than a predetermined level after one stimulus and accomplished the present invention.

The term "after imparting one stimulus" as used herein means the time at which, by a stimulus (one stimulus) for depositing metal fine particles on a surface of a substrate, the metal fine particles are deposited from an electrolytic solution and is stabilized as a state for display.

While the one stimulus (hereinafter sometimes referred to as a "deposition stimulus") for depositing the metal fine particles is not particularly limited so long as it can impart some form of energy to a metal ion in the electrolytic solution, according to the invention, it is preferable to utilize electric current (electric field method), light (light method), or ultrasonic wave (vibration method) and it is particularly preferable to utilize electric current. Further, plural stimuli such as light, electricity, and ultrasonic wave may be imparted.

Further, while the display method according to the invention may be a display method capable of displaying the image only once, it is particularly preferable that the display method according to the invention is capable of rewriting the image in a repeated manner. Namely, it is preferable in the display method according to the invention that another image can be displayed by dissolving at least some of, or portions of, the metal fine particles deposited from the electrolytic solution by imparting another stimulus.

Further, while another stimulus (hereinafter, referred to also as "dissolution stimulus") is not particularly limited so long as it can impart some form of energy to the metal fine particles and, according to the invention, it is preferable to utilize electric current, light or, further, as need arises, ultrasonic wave and it is particularly preferable to utilize electric current. Further, the kind of the deposition stimulus and the kind of the dissolution stimulus may be same with or different from each other.

It has been found that, according to the invention, by having the concentration of the metal ion contained in the electrolytic solution about 200 mmol/l (millimole/liter) or less after imparting the one stimulus, a high degree of whiteness in background portion, high contrast between the background portions and image portions, and high color purity in the image portions can be obtained. These advantages are particularly significant in a reflection type display. The "metal ion", which is an ion of the metal contained in the metal fine particle to be deposited, is not necessarily the same as the metal constituting a metal electrode provided on a substrate (hereinafter, referred to also as "counter substrate") at the side opposite to the substrate (hereinafter, referred to also as "display substrate"). Further, the "metal ion" does not refer to ions of other metals in the electrolytic solution.

In a case where the concentration of the metal ion in the electrolytic solution is more than about 200 mmol/l, the degree of whiteness in the background portions in the display is decreased, thereby tending to give insufficient contrast to the image portions. Further, color purity may deteriorate depending on the color shown in the image portions. The concentration of the metal ion is preferably about 150 mmol/l or less, more preferably about 100 mmol/l or less and, most preferably about 0 mmol/l.

While the metal ion contained in the metal fine particles according to the invention is not particularly limited so long as it can be deposited as metal fine particles, preferable examples are gold ion, copper ion, or silver ion. Metal ions which are not transparent in color, such as gold or copper ions, can be particularly preferably used in the present invention.

The concentration of the metal ion can be determined by an X-ray fluorescence (XRF) analysis. Specifically, for example, the concentration of the metal ion can be determined by using a conventionally-known X-ray fluorescence meter (meanwhile, a known apparatus, that is, an X-ray fluorescence (XRF) analyzer (trade name: XRF-1800, manufactured by Shimadzu Corporation) for X-ray fluorescence (XRF) analysis for confirmation of the present condition), a calibration curve is constructed, and then a sample is prepared by sampling a small amount of the electrolytic solution after display and diluting thereof with a solvent. The analysis is performed under the conditions of an X-ray tube voltage of 40 kV, a filament current of 70 mA, and a sample amount of 5 g.

According to the present invention, in order to operate the display while keeping the concentration of the metal ion in the electrolytic solution after imparting one stimulus as described above low, it is preferable that the electrolytic solution contains, as a supporting electrolyte, a salt with which the metal ion forms a complex. By utilizing this configuration, even in an exemplary case where the metal electrode provided on an opposed substrate side is imparted with one stimulus, an elution of a large amount of metal at one time does not occur, and an eluted metal ion becomes to easily form a complex with a salt, which is the supporting electrolyte, and move in the electrolytic solution by electrophoresis so as to be deposited at the display substrate. As a result of such behavior as described above, the concentration of the metal ion in the electrolytic solution after imparting the stimulus (at the time of display) is suppressed at a considerably low level. The supporting electrolyte to be used in the invention will be described below.

Hereinafter, explanations regarding the display method of the present invention are provided in accordance with the configuration of the display device of the present invention.

FIG. 1 is a schematic sectional view showing one example of the display medium of the invention and shows the display medium of an electric field mode. In FIG. 1, 1 indicates a display medium, 10 indicates a transparent substrate, 11 indicates a transparent electrode, 20 indicates a substrate, 21 indicates an electrode, 30 indicates an electrolyte, and each of 40 indicates a spacer.

The display medium 1 shown in FIG. 1 contains the transparent substrate 10, the substrate 20 that is arranged oppositely at a constant interval to the transparent substrate 10, the electrolyte 30 filled up between the transparent substrate (display substrate) 10 and the substrate (counter substrate) 20, the spacers 40 prepared at the both ends of the transparent substrate 10 in the direction toward the surface of the substrate, the transparent electrode 11 arranged on the surface of the transparent substrate 10 in the side where the electrolyte 30 is located, and the electrode 21 arranged on the surface of the substrate 20 in the side where the electrolyte 30 is located. The spacers 40 further work as sealing materials for preventing leakage of the electrolyte 30 filled up between the transparent substrate 10 and the substrate 20. In cases where the substrate 20 is made of a metal, the electrode 21 may be unnecessary depending on occasions. In such cases, the substrate 20 plays the role of the electrode 21. Further, the transparent electrode 11 and the electrode 21 are connected to the power sources which are not shown in the FIGURE.

The transparent electrode 11 may contain plural divided electrodes so that deposition and dissolution of each pixel (or unit area) can be respectively controlled. Further, the surface of the transparent electrode 11 may have pores having a pore size distribution. When the transparent electrode includes plural electrodes as mentioned above, pixels corresponding to RGB can be formed by making the average size of pores on one electrode being different from those of the average sizes of pores on other electrodes. In addition, the color of the surface of the electrode 21 may be white in order to carry out a display with white solid color when all of the fine metal particles 31 existing in the surface of the transparent electrode 11 are dissolved.

Though in the display device 1 shown in FIG. 1, the fine metal particles 31 are drawn large so that plural particles having nearly equal particle sizes are located on the flat surface of the transparent electrode 11 in order to make the explanation easy, the actual deposition form of the fine metal particles 31 is not necessarily limited to the deposition form shown in FIG. 1.

Various materials can be used as the pair of substrates 10 and 20 as long as at least one thereof is translucent. Examples of the translucent substrate include conventionally-known transparent plastic substrate, a glass substrate and the like. It is preferable that a degree of light transmission of the substrate with respect to visible light is high.

Specific examples of the substrate material which can be used in the invention include high molecular films or plate-shape substrates of polyester, polyimide, polyolefin, an acrylic resin such as polymethyl (meth)acrylate, polystyrene, polyethylene, polypropylene, polycarbonate, polyether sulfone, nylon, polyurethane, polyvinyl chloride, polyvinylidene chloride, or cellulose compounds; glass substrates of quartz glass or white glass; metals; metal films; and ceramics. Particularly, when a film substrate having a bending property is used as a pair of substrates 10 and 20, a display medium having flexibility (bending property) can be obtained. When such a display medium having flexibility is used, it is further facilitated to utilize the display medium according to the invention in applications in which flexibility is required such as electronic paper or portable electronic appliances.

The electrolytic solution 30 is not particularly limited so long as it can contain a metal ion for depositing metal fine particles 31 and a solvent. Various types of materials can be used as need arises. According to the invention, the metal ion is present in the electrolytic solution at least at the time of imparting deposition stimulus, and may not be present in the electrolytic solution after imparting the deposition stimulus.

Conventionally-known metal ions can be utilized as the metal ion as long as they can be at least reduced by imparting the deposition stimulus so as to deposit metal fine particles, and after being once reduced into metals, oxidized by imparting dissolution stimulus and easily dissolved in the electrolytic solution. Preferable examples of the metal used in the invention include a gold (Au) ion, a silver (Ag) ion, and a copper (Cu) ion. More preferable examples thereof include a gold ion and a copper ion. Other than these ions, a palladium (Pd) ion, a platinum (Pt) ion, a rhodium (Rh) ion, a ruthenium (Rh) ion, a nickel (Ni) ion, an iron (Fe) ion, a cobalt (Co) ion, a zinc (Zn) ion, a lead (Pb) ion, a chromium (Cr) ion, a tin (Sn) ion or the like can be used.

The counter ion of the metal ion is not particularly limited as long as the metal ion can stably exist in an ionic state in the electrolyte as long as no stimulus is given thereto. Examples of the counter ion include a fluorine ion, a chlorine ion, a bromine ion, an iodine ion, a perchlorate ion, and a fluoroborate ion. The concentration of the metal ion in the electrolyte is as described above.

Preferable examples of the metal compound used in the electrolyte 30 in cases where the metal ion is a gold ion or a silver ion include chloroauric acid, sodium chloroaurate, sodium aurotiosulfate, sodium auric chloride, sodium gold sulfite, silver halide, and silver nitrate.

Water, alcohols such as methanol, ethanol or isopropyl alcohol, and other non-aqueous solvents (organic solvents and the like) can be used as the solvent singly or in combination of two or more thereof. Examples of other additives suitably utilized include resins, surfactants, electrolytes other than metal ions (which are to be deposited as the fine metal particles), fine polymer particles, fine inorganic particles such as fine metal oxide particles, and the like. The solvent is used to dissolve an electrolyte, to dissolve or disperse a polymer, and to dissolve or disperse a surfactant and the like.

Examples of the non-aqueous solvents include aprotic non-aqueous solvents such as ethylene carbonate, propylene carbonate, butylene carbonate, dimethyl carbonate, diethyl carbonate, ethyl methyl carbonate, methyl acetate, ethyl acetate, ethyl propionate, dimethyl sulfoxide, γ-butyrolactone, dimethoxyethane, diethoxyethane, tetrahydrofuran, formamide, dimethylformamide, diethylformamide, dimethylacetamide, acetonitrile, propionitrile, 2-pyrrolidone, N-methylpyrrolidone, sulfolane, or silicone oils.

Examples of the resin include polyalkylene oxides such as polyethylene oxide, polyalkyleneimines such as polyethyleneimine, and polymers such as polyethylene sulfide, polyacrylate, polymethyl methacrylate, polyvinylidene fluoride, polycarbonate, polyacrylonitrile, or polyvinyl alcohol, each of which may be used singly or in combination of two or more thereof. Being dissolved or dispersed in a solvent, the resin will contribute to the control of the moving velocity of the metal ion and the electrolyte ion and to the stabilization of deposited fine metal particles. The amount of addition of the resin is adjusted in consideration of its relation to the kind of a surfactant and the amount of its addition.

The surfactant will contribute to the stabilization of deposited fine metal particles and to the control of the particle size of deposited particles. The particle size can be controlled to be small by increasing the addition amount of the surfactant.

Examples of the selectable kinds of the surfactant include cationic surfactants (such as an alkylamine salt, a quaternary ammonium salt or the like), nonionic surfactants (such as polyoxyethylene alkylether, polyoxyalkylene alkylether, polyoxyethylene compounds, sorbitan fatty acid ester, polyoxyethylene sorbitan fatty acid ester, polyoxyethylene sorbitol fatty acid ester, glycerine fatty acid ester, polyoxyethylene fatty acid ester, polyoxyethylene hardened caster oil, polyoxyethylene alkylamine, alkylalkanolamide or the like), anionic surfactants (such as an alkylsulphate salt, a polyoxyethylene alkylethersulphate salt, an alkyl benzene sulfonate salt, an alkylnaphthalenesulfonate salt, an alkylsulfosuccinate salt, an alkyldiphenylether disulfonate salt, a fatty acid salt, a polycarboxylic acid high-molecular surfactant, a sodium salt of condensate of aromatic sulfonic acid and formalin, a sodium salt of condensate of β-naphthalenesulfonic acid and formalin, or the like), amphoteric surfactants, and the like.

Various kinds of polymer particles can be used as the organic fine particles. Examples thereof include urethane fine particles, polymethacrylate fine particles, silicone polymer fine particles, fluoropolymer fine particles and the like. The polymers of these particles are preferably cross-linked. The particle size of these particles may be in a range of approximately 0.001 μm to 30 μm, and preferably in a range of approximately 0.001 μm to 10 μm.

Examples of the inorganic fine particles include fine particles containing, as a main component thereof, aluminum oxide, silicon dioxide, magnesium carbonate, calcium carbonate, titanium dioxide, barium titanate or the like. The particle size of these particles is in a range of approximately 0.001 μm to 30 μm, and preferably in a range of approximately 0.001 μm to 10 μm. The surfaces of these particles are preferably treated with a finishing agent such as a silane coupling agent, a titanate coupling agent or the like for the purposes of obtaining dispersibility into a solvent and protection from a solvent. These fine particles are used as white pigment. Namely, these fine particles exhibit white in the display medium.

The electrolytic solution preferably contains a supporting electrolyte with which the metal ion forms a complex. The "supporting electrolyte" denotes a salt which is not directly involved in a deposition reaction of the metal fine particles and is used for eluting a metal from a metallic electrode or the like.

In view of easiness in forming complexes with gold, silver and copper, it is preferable to use salts such as a halogenated compound or cyanide, which come to be a halide ion or a cyanide ion in the electrolytic solution, as the supporting electrolyte. Specific examples thereof include LiX, NaX and KX (in which X represents a fluorine atom, a chlorine atom, a bromine atom, an iodine atom or an CN.). Further, a halogenated quaternary ammonium salt such as tetraalkyl quaternary ammonium bromide may also be used.

In the electrolytic solution, other salts may simultaneously be present in addition to the halogenated compound or a cyanide compound. Examples of such salts include perchlorates of Li, K, or Na, and alkylbenzene sulfonate.

Among these, In a case where the gold ion is used as the metal ion, preferable examples thereof include tetrachloroauric acid, a lithium salt of tetrachloroauric acid, a sodium salt of tetrachloroauric acid, a potassium salt of tetrachloroauric acid, tetrabromoauric acid, a lithium salt of tetrabromoauric acid, a sodium salt of tetrabromoauric acid, a potassium salt of tetrabromoauric acid, tetracyanoauric acid, a sodium salt of tetracyanoauric acid and a potassium salt of tetracyanoauric acid. In a case where the copper ion is used as the metal ion, preferable examples thereof include halogenated copper (such as copper chloride or copper bromide) and copper sulfate. In a case where the silver ion is used as the metal ion, preferable examples thereof include halogenated silver (such as silver iodide or silver bromide), silver nitrate, silver perchlorate, silver cyanide and silver thiocyanide.

A concentration of the supporting electrolyte in the electrolytic solution is preferably in the range of from 0.001 to 2 mol/l, and more preferably in the range of from 0.01 to 1 mol/l.

When the concentration is less than 0.001 mol/l, there is a case in which the metal can not be eluted to an amount which is effective as the metal ion in response to the deposition stimulus. Further, when the concentration is more than 2 mol/l, there is a case in which the metal is eluted excessively and thus a high degree of whiteness can not be obtained in the background portion at the time of display.

When the display medium of the invention is used as a reflection type display medium, a reflection layer may be provided at the counter substrate side. Alternatively, a reflective material may be mixed in the electrolytic solution. Particles containing generally-known metal oxide can be used as the reflective material. Specific examples of the metal oxide include titanium dioxide, silica, calcium carbonate, magnesium oxide, aluminum oxide, zinc oxide, cesium oxide, and yttrium oxide. Among these materials, titanium dioxide, aluminum oxide and zinc oxide are particularly preferable in view of availability at low cost.

The electrolyte containing the above-described constituents may be in a form of a gel. By providing the electrolyte in a form of a gel, it becomes easy to prevent flowing out or leakage of the electrolyte toward outside the display medium even when a portion of the display medium is damaged. In order to make the electrolyte in a form of a gel, water-soluble resins and the like can be utilized.

Next, explanations regarding the electrode are provided. According to the invention, it is preferable that at least one of a pair of electrodes has a metallic electrode on its surface which resides at the side thereof which is in contact with the electrolyte 30.

A transparent electrode 11 in FIG. 1 is a display electrode provided at the display substrate side. The transparent electrode 11 is required to be transparent such that the metal fine particles can be visually recognized from the side of the transparent substrate 10. Preferable examples of such materials for forming the transparent electrode 11 include ITO (Indium Tin Oxide), $SnO_2$, $In_2O_3$, MgO, and ZnO.

The transparent electrode 11 may be provided in a form of a porous electrode in order to control the size distribution of the metal fine particles being deposited as described below. Specific examples thereof include a film obtained by anodic oxidation of aluminum and porous materials having nanometer-scale pores such as zeolite, porous glass, activated carbon fibers, nanoporous silicon, nanoporous organic resins, nanoporous titanium oxide, fullerene, FSM-16 mesoporous silica, alumina, silica gel, hydroxyapatite, clay, or molecular shieves.

In a case where a material which is made porous by sintering titanium oxide particles is used as the porous electrode, the volume average particle diameter of the titanium oxide particles is in a range of approximately 5 to 200 nm, and preferably in a range of approximately 10 to 60 nm.

The porous electrode may have a configuration having, on a conventionally-known conductive material described below, the porous material.

Examples of the materials for forming the counter electrode 21 include conventionally-known conductive materials such as gold, platinum, silver, aluminum, copper, chromium, cobalt or palladium, metal oxides such as ITO (Indium Tin Oxide), or conductive polymers such as polyphenylvinylene, polyacetylene, polypyrrole, and polyaniline.

While the metal for use in the electrode 21 may be a metal different from that of the metal ion contained in the metal fine particles 31 contained in the electrolytic solution, it is particularly preferable that the electrode 21, which is in contact with the electrolytic solution 30, is formed of the same metal as that of the metal ion contained in the electrolytic solution 30. By having such a constitution, when the metal fine particles are deposited on the transparent electrode 11 by applying voltage between electrodes, the metal ion is eluted from the electrode 21, and when the metal fine particles on the transparent electrode 11 are eluted, the metal ion are deposited on the electrode 21. By these operations, when rewriting for repeated display is performed, the concentration of the metal ion in the electrolytic solution 30 comes to be constant, to thereby perform a stabilized deposition and elution, namely, a stabilized color control.

Since a gold ion, a silver ion and a copper ion are preferable as the metal ion, it is preferable that when the metal ion is a gold ion, a silver ion or a copper ion, materials of the electrode 21 is gold, silver, or copper, respectively.

The spacer 40 can be constituted by a resin, a metal oxide, glass or the like. Further, while an arrangement of the spacer 40 is not particularly limited, the spacer 40 is positioned such that a sufficiently uniform space between the substrates can be secured so as to secure arrangement regions of the transparent electrode 11 and the electrolytic solution 30.

While a shape of the spacer 40 is not particularly limited as long as the spacer 40 can stably maintain the space, the shape of the spacer 40 is preferably an independent shape such as a spherical, cubic, or columnar shape.

The space formed by the spacer 40 is preferably in the range of from about 1 to about 200 µm.

Next, specific processes of deposition of the metal fine particle by the display method according to the invention, display thereby and the like are described.

According to the invention, the deposition of the metal fine particles is effected such that, at the time of imparting deposition stimulus, the metal ion in the electrolytic solution is reduced, and the thus-reduced metal ion is deposited on a surface of any one of a pair of substrates (metal fine particle deposition process), while the dissolution of the metal fine particles is effected such that, at the time of imparting dissolution stimulus, the metal contained in the metal fine particles is oxidized, and the thus-reduced metal is dissolved in the electrolytic solution as a metal ion. On this occasion, the deposition and dissolution can be controlled by appropriately selecting a kind, intensity, polarity, wavelength, frequency and the like of the stimulus to be imparted. For example, when an electric current is used as the stimulus for deposition and dissolution, the deposition and the dissolution can be controlled by having polarities of both stimuli to be different from each other.

Further, in the deposition stimulus, two kinds or more of stimuli may be used in combination so as to be almost simultaneously imparted. The combination of two kinds or more of stimuli may also be similarly applicable to the dissolution stimulus. Preferable examples of the embodiment in which two kinds or more of stimuli are used in combination and almost simultaneously imparted include an exemplary embodiment in which a main stimulus that roughly controls the deposition and dissolution of the metal fine particles and an assist stimulus that performs a delicate control which is difficult to be performed only with the main stimulus are used in combination. On this occasion, examples of the main stimulus include an electric current, an examples of the assist stimulus to be simultaneously used include light (particularly, UV light), ultrasonic wave, heat and the like.

These processes as described above are explained with reference to an example in which display is conducted by an electric field method using the display medium shown in FIG. 1.

Firstly, in the display medium 1 having the constitution as described above, a predetermined electric field is imparted between electrodes by applying a constant current (for example, in a range of approximately 0.001 to 100 mA/cm$^2$, and preferably in a range of approximately 0.01 to 50 mA/cm$^2$ in terms of current density) to a pair of a transparent electrode 11 and an electrode 21 as electric field imparting measures for a given period of time (for example, in a range of 5 microsecond to about 5 seconds, and preferably in a range of 10 microsecond to 1 second). By this electric field, the metal ion (such as a gold ion or a copper ion) is deposited as metal fine particles 31 on the transparent electrode 11 at the interface thereof with the electrolytic solution 30. By the thus deposited article which is in a state of a particle shape, display of colors generated by the plasmon absorption, such as red, orange (, which is shown in a case where the metal ion is a gold ion), brown (, which is shown in a case where the metal ion is a silver ion), or the like, is performed.

When a current which is reverse to the constant current is applied to a pair of the transparent electrode 11 and the electrode 21, an electric field which is reverse to the electric field is implied between the electrodes, and the metal fine particles deposited in the transparent electrode 11 at the interface thereof with the electrolytic solution 30 is eluted into the electrolytic solution 30 by this reverse electric field.

In order to have the metal fine particles 31 show color due to surface plasmon resonance, the particle size of metal fine particles 31 is, though depending on the kind of the metal composing this metal fine particles, preferably in the range of approximately 1 to 100 nm, and more preferably in the range of approximately 3 to 70 nm. When the particle size is out of the range, the deposition of fine metal particles does not lead to showing of color due to surface plasmon resonance and there may be some cases where color display can not be carried out. As is described above, since the size of the fine metal particles which work as a coloring source is around several tens nm in the invention, the size of the pixel can be made small. Consequently, for example, it is possible to carry out an image display with extremely high resolution of around 300 to 600 dpi.

The number of metal fine particles 31 to be present (per unit area) is preferably in the range of about 10 to about 1,000/μm$^2$, and more preferably in the range of about 50 to 500/μm$^2$.

When the number thereof per unit area is less than about 10/μm$^2$, an amount of the metal fine particles which constitute the image may become insufficient and there may be some cases in which a sufficient image density can not be obtained. On the other hand, when the number thereof is more than about 1,000/μm$^2$, an interval between the metal fine particles to be deposited becomes relatively narrower and thus the metal fine particles tend to form an aggregate, and as a result thereof, there may be some cases in which exhibited color purity comes to be unsatisfactory. Specifically, the interval between adjacent metal fine particles to each other is preferably in a range of approximately 30 to 340 nm, and more preferably in a range of 40 to 150 nm.

The particle size and the ratio of existence of the metal fine particles 31 can be confirmed by observing the deposited medium using an atom force microscope (trade name: WA 200; manufactured by Hitachi Kenki Fine Tech Co., Ltd.) with about 300,000 magnification times. Specifically, a particle diameter and a number of platinum fine particles to be observed in the image in an area of about 250 μm$^2$ are measured, and this procedure is performed on 5 images, and then an average of the values to be obtained of each of the particle diameter and the number is determined.

On the other hand, the coloration wavelength in color due to surface plasmon resonance depends on the particle size of the fine metal particles, for example, in cases where the fine metal particles are composed of Au, they are colored in red when the particle size is around 15 nm, and colored in blue when the particle size is around 45 nm.

This fact means that the ratio of the fine metal particle that can in fact contribute to a specific coloration relative to all of deposited fine metal particles, and the fact makes assuring of sufficient concentration of color obtained the coloration difficult. Accordingly, when only the fine metal particles having the particle size within the range of the predetermined particle size are selectively deposited in the specific area of the solid surface, it is considered that a specific color display can be carried out on the desired position of the solid surface.

In view of the above, the particle size distribution of the fine metal particles deposited in the specific area of the solid surface from the electrolyte has one or more maximum peaks and at least any one of the maximum peaks preferably meets the following Inequality (1):

$$Pp(\pm 30)/Pp(T) \leq 0.5 \qquad \text{Inequality (1):}$$

In Inequality (1), Pp(T) represents a greatest peak height of the maximum peaks; and Pp(±30) represents a peak height at the particle size of particle size ±30% of the metal fine particles at the maximum peak height.

While the specific area may be all areas in which the metal fine particles can be deposited in the surface of the electrode (substrate), it may ordinarily be one portion out of the all areas on which the metal fine particles can be deposited. Further, the specific area is not required to correspond to pixels, and the specific area may encompass plural pixels in accordance with necessity. Areas or shapes of one specific area and other specific area may be same with or different from one another.

The value of Pp(±30)/Pp (T) in Inequality (1) is more preferably about 0.4 or less, and further preferably about 0.3 or less. That is, the fine metal particles are preferable to be near monodisperse. In cases where the value of Pp(±30)/Pp (T) exceeds about 0.5, since the particle size distribution of the fine metal particles to be deposited becomes too broad, the color tone of coloration may become indistinct and only the monotone display may become possible to be carried out.

Further, in the invention, the measurement of the particle size distribution and average particle size of the fine metal particles within the specific area (or the unit area) and of the pore size distribution and average pore size of the solid surface within the specific area (or the unit area) can be carried out as follows.

The average particle size and particle size distribution of the fine metal particles can be obtained by analyzing the image of the solid surface where the fine metal particles are deposited, which image has been photographed in 100,000 magnification times using a scanning electron microscope (FE-SEM, trade name: S-5500, manufactured by Hitachi, Ltd.), with an image analysis apparatus (trade name: ROUZEX AP, manufactured by Nicole, Co., Ltd.). The number of the fine metal particles sampled for the image analysis is 100 pieces. As the average particle size, a circle equivalent diameter converted from the area is used.

Methods for controlling the particle size distribution and the average particle size of the metal fine particles to be in a preferred range are roughly assorted into three kinds and such controls may be carried out in a combination of two kinds or more thereof.

First example of the controlling method is a method including utilizing a surface of a porous electrode on which pores having a predetermined average particle size and pore size distribution are provided. A surface of a solid having amorphous and/or continuously-bonded pores constituted by an aggregate of fibers or needle-shaped materials may also be utilized. In a latter case, the particle size distribution or the average particle size of the metal fine particles can be controlled by adjusting the size or the configuration of the space formed between respective fibers or needle-shaped materials by controlling thickness, density, orientation state and the like of the fibers or needle-shaped materials.

Second example of the controlling method is a method including adjusting a condition for imparting the deposition stimulus. For example, when the deposition stimulus is an ultrasonic wave, particle size or particle distribution of the metal fine particles can be controlled by adjusting frequency or intensity of the ultrasonic wave. Further, when the deposition stimulus is light, the particle size or the particle distribution of the metal fine particles can be controlled by adjusting wavelength of the light to be irradiated.

Third example of the controlling method is a method including adjusting a formulation of the electrolytic solution. While the electrolytic solution to be used in the invention is not particularly limited as long as it contains the metal ion which constitutes the metal fine particles that are deposited at least on the surface of the substrate, as need arises, the electrolytic solution may further contain other components such as a surfactant. Therefore, the particle size and the particle distribution can be controlled by firstly selecting a system in which the metal ion in the electrolytic solution is easily deposited in a particle shape and then optimizing the formulation of the electrolytic solution so that desired particle size and particle distribution of the metal fine particles can be obtained, while the control of the particle size and particle distribution may further depend on the kind of the stimulus, conditions for imparting stimulus or the like.

According to the invention, elution and deposition of the metal are carried out by utilizing a specified supporting electrolyte in order to allow the concentration of the metal ion in the electrolytic solution to be lower. It is a display method which is also favorable for controlling the particle size, the particle distribution and the like of the metal fine particles.

According to the invention, it is preferable that the one stimulus (deposition stimulus) is an application of a current; initially a current is applied having a polarity that is the reverse to that of the current which deposits the metal fine particles; and metal ions in the electrolytic solution are deposited in advance on the surface of the metal electrode (counter electrode) from which metal ions are eluted by the one stimulus.

By such procedure as described above, at least at the initial stage, the degree of whiteness of the background portion in the display can be enhanced, and in the repeated rewriting, the concentration of the metal ion in the electrolytic solution can be kept low as a whole. Further, when a predetermined amount of the metal ion of the metal fine particles which is to be deposited at the time of display is contained in the electrolytic solution in advance and the metal ion is initially deposited on the surface of the counter electrode before the display and then elution for the display is carried out, the display medium can be constituted by using other metal electrode as a counter electrode in a case where an expensive metal is the metal ion.

In the display medium according to the invention, when the white reflection coefficient is evaluated by means of optical density (OD), it is preferably approximately 0.4 or more, and more preferably approximately 0.2 or more either in the background portion in a display state, or in a non-display state. The measurement of the white reflection coefficient is conducted such that the display medium is placed on a reference black board, and an optical density (OD value) in a state in which voltage is not applied is then measured by using a reflection densitometer (trade name: MACBETH RD-918, manufactured by Macbeth Co.).

When a contrast between the image portion and the background portion is evaluated in terms of a ratio of the reflection coefficient (colored reflection coefficient) of the display medium in a colored state (black) to the white reflection coefficient (namely, colored reflection coefficient: white reflection coefficient), the ratio is preferably approximately 1:4 or more and, more preferably approximately 1:10 or more.

The above explanation is provided in consideration of a case where electric current is used as the deposition stimulus and/or the dissolution stimulus.

When light is used as the deposition stimulus and/or the dissolution stimulus, the solid surface preferably has a photocatalytic function. The "photocatalytic function" means a function of reducing metal ions in an electrolyte to deposit fine metal particles and/or a function of oxidizing fine metal particles (metals constituting the particle) to dissolve the metals. In this case, through irradiating light over the solid surface, when a reductive reaction is taken place on the solid surface, fine metal particles are deposited, and when an oxidation reaction is taken place, the fine metal particles deposited on the solid surface are dissolved.

On the other hand, in a case where the deposition stimulus is an ultrasonic wave, it is preferable to constitute a reaction system so that a high temperature and high pressure cavity is formed as a sonochemical field in an electrolyte when an ultrasonic wave is applied, and metal ions are reduced by the energy in the cavity, resulting in the deposition of the metal fine particles.

The display device of the invention can utilize a stimulus given from the outside of the display device (hereinafter, it may be referred to as "an external stimulus") as the deposition stimulus or the dissolution stimulus in case of writing/rewriting/eliminating an image. However, because the external stimulus requires something outside the display device as a source for giving a stimulus, sometimes it is difficult to write/ rewrite/eliminate an image thereby in arbitrary timing, resulting in lacking convenience. Accordingly, the display device of the invention may be provided with a part for giving a stimulus for giving at least one of the deposition stimuli and the dissolution stimulus to be used for displaying an image.

Moreover, in cases where the display device of the invention can display repeatedly and has only the part for giving a stimulus that can give one stimulus out of the deposition stimulus and the dissolution stimulus, a stimulus given from the outside of the display device (hereinafter, it may be referred to as "an external stimulus") can be utilized as another stimulus. Of course, in a case where the display device of the invention can display repeatedly and has the part for giving a stimulus that gives both of the deposition stimulus and the dissolution stimulus, the display device may further be able to write/rewrite/eliminate an image by utilizing an external stimulus. And, in the display medium having no part for giving a stimulus, an external stimulus is utilized as the deposition stimulus or the dissolution stimulus.

Further, the display device of the invention may be provided with two or more kinds of parts for giving a stimulus. In this case, the kind of a stimulus given by one part for giving a stimulus may be different from the kind of a stimulus given by another part for giving a stimulus.

Examples of a means (device) for giving a stimulus in cases where the deposition stimulus and the dissolution stimulus to be utilized for displaying an image include an electric current, a battery, a solar battery, and the like. Examples of a means (device) a part for giving a stimulus in cases where the deposition stimulus and the dissolution stimulus to be utilized for displaying an image include light, various light sources such as LED and the like. Examples of a means (device) for giving a stimulus in cases where the deposition stimulus and the dissolution stimulus to be utilized for displaying an image are an ultrasonic wave include a piezoelectric element and the like.

Moreover, in cases where an external stimulus is an electric current, an external power source like an outlet can be utilized. However, in this case, the display medium needs to be provided with a terminal and the like that can connect to an electrode and an external power source so as to utilize an external power source.

In cases where an external stimulus is light, all kinds of light sources can be utilized in principle. However, when being considered that the light sources are utilized under a general irradiation environment, the display medium of the invention preferably hardly cause spontaneous rewriting or elimination of an image display even when being exposed to indoor lighting, sunlight or the like. And it is preferable that the display medium can write, rewrite, or eliminate an image display only when being exposed to a specific light source, for example, a light source giving off light with a specific wavelength like lasers, or a light source having stronger irradiation intensity than indoor lighting and sunlight.

In the display method (display medium) according to the invention as described above, a color display can be carried out without using a color filter which is used in the conventional display method using the electrolytic solution, and the display having a high contrast can be also carried out while maintaining a high white reflection coefficient. For this reason, deterioration of display sharpness of the display which is a hindrance at the time of using a color filter or deterioration of contrast can be suppressed.

EXAMPLES

Hereinafter, the present invention will be explained with reference to examples, while the present invention is not limited thereby.

Example 1

Preparation of Display Device

A display medium having the constitution as shown in FIG. 1 is prepared in the procedures as described below.

Firstly, a transparent non-alkali glass substrate 10 (thickness: 1 mm, size: 10 cm×10 cm) on one side of which an ITO film (film thickness: 200 nm) is provided as a transparent electrode 11 as a display electrode, is prepared. An area of the display electrode portion is set to be 0.25 $cm^2$.

On the other hand, tetrabutyl ammonium bromide and lithium perchlorate are dissolved in DMSO (dimethyl sulfoxide) as supporting electrolytes so that the concentration of the tetrabutyl ammonium bromide becomes 0.5 mol/l and that of the lithium perchlorate becomes 0.1 mol/l. 100 parts by mass of the resultant solution is added with 120 parts by mass of titanium oxide and stirred so as to prepare an electrolytic solution 30.

Next, a spacer having a thickness of 100 μm is provided on an electrode-provided side of the transparent substrate 10 on which the transparent electrode 11 is provided. A non-alkali glass substrate 20 (thickness: 1 mm, size: 10 cm×10 cm), which has an electrode 21 which is a metallic electrode formed by spattering so as to have a thickness of 100 nm as a counter electrode, is stacked to the transparent substrate 10 so that respective electrodes face with each other. Subsequently, an entire periphery, except for one portion, of an end face of the thus obtained stacked body is sealed with an ultraviolet ray-curable resin (trade name: 3121, manufactured by Thee Bond Co.) and cured by irradiation of ultraviolet ray.

Further, the electrolytic solution 30 is filled in the stacked body from the portion of the end face of the laminate, which is not sealed with the resin (electrolytic solution-pouring inlet). After the filling, the electrolytic solution-pouring inlet is sealed with the ultraviolet ray-curable resin and cured by irradiation of ultraviolet ray so as to prepare a display device. When the device is observed from the display substrate side, the device looks white. A white reflection coefficient of the device measured by using a Macbeth densitometer (trade name: MACBETH RD-918; manufactured by Macbeth Co.) is 0.15 (OD).

Evaluation of Display device

Next, a side of an Au electrode, which is the counter electrode of the display device, is set to be positive, and a side of an ITO electrode, which is a display electrode of the display device, is set to be negative. When a direct current was allowed to flow between both electrodes with a constant current voltage of 1 V and current density of 0.1 $mA/cm^2$, a display electrode portion of the display device is colored to be red. Further, when the current is excessively flown, the display electrode portion is colored to be black. Subsequently, when the current is flown with reversed polarity, the red color is completely disappeared. Such coloration-decoloration operation is repeated $10^5$ times, and thereafter, the ITO electrode is set to be negative so that the display electrode portion is colored to be red.

When the red-color absorbance is measured by using a spectrophotometer (trade name: U-4000, manufactured by Hitachi, Ltd.), an absorbance peak thereof is about 520 nm, a peak half-value width thereof is 55 nm, and thus a color purity thereof is excellent. A white reflection coefficient of the background portion measured by using a reflection densitometer (MACBETH RD-918, described above) is 0.15 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800; manufactured by Shimadzu Corporation). It is then found that the concentration of gold is 0.08 mmol/l. The concentration is determined by a calibration curve formed prior to the measurement.

Besides, the display device which is in a state of fully colored in red is decomposed. A surface of the display electrode portion thereof is then observed and measured by using an atom force microscope. It is found that gold metal fine particles are deposited on the surface of the ITO electrode. An average particle size of the metal fine particles is 10 nm, and a ratio of existence thereof is 430 pieces/$\mu m^2$. A calculation of $Pp(\pm 30)/Pp(T)$ thereof is conducted to confirm the value is about 0.42.

Example 2

Preparation of Display Device

A display medium of Example 2 is prepared ion the same manner as that for Example 1, except that copper is used in place of the gold for the counter electrode 21, tetrabutylammonium bromide is used as the supporting electrolyte, and sodium bromide is used in place of lithium perchlorate so that the concentration of the sodium bromide becomes 0.6 mol/1.

When the device is observed from the display substrate side, the device looks white. A white reflection coefficient of the device measured by using a Macbeth densitometer (trade name: MACBETH RD-918, described above) is 0.15 (OD).
Evaluation of Display device Evaluations for the display device of Example 2 are carried out in the same manner as in Example 1. A coloration of a display electrode portion of the display device of Example 2 in the former stage is red similarly to Example 1. Further, when the current is excessively flown, the display electrode portion of the display device of Example 2 is colored to be black.

Subsequently, when the coloration-decoloration operation is repeated $10^5$ times, a coloration of the display electrode portion of the display device of Example 2 is red which is similar to that in the former stage.

When the red-color absorbance is measured by using a spectrophotometer (trade name: U-4000, described above), an absorbance peak thereof is about 565 nm, a peak half-value width thereof is 60 nm, and thus a color purity thereof is excellent. A white reflection coefficient of the background portion measured by using a reflection densitometer (MACBETH RD-918, described above) is 0.15 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800; manufactured by Shimadzu Corporation). It is then found that the concentration of copper is 0.11 mmol/l. The concentration is determined by a calibration curve formed prior to the measurement.

Besides, the display device which is in a state of fully colored in red is decomposed. A surface of the display electrode portion thereof is then observed and measured by using an atom force microscope. It is found that copper metal fine particles are deposited on the surface of the ITO electrode. An average particle size of the metal fine particles is 30 nm, and a ratio of existence thereof is 510 pieces/$\mu m^2$. A calculation of $Pp(\pm 30)/Pp(T)$ thereof is conducted to confirm the value is about 0.39.

Example 3

Preparation of Display Device

Chloroauric acid is dissolved in DMSO (dimethyl sulfoxide) so that the concentration thereof becomes 0.5 mol/l. 100 parts by mass of the resultant solution is added with 120 parts by mass of titanium oxide and stirred so as to prepare an electrolytic solution. A display device of Example 3 is prepared in the same manner as in Example 1 except that the thus obtained electrolytic solution is used in place of the electrolytic solution 30.

When the device is observed from the display substrate side, the device looks slightly-yellow white. A white reflection coefficient of the device measured by using a Macbeth densitometer (trade name: MACBETH RD-918, described above) is 0.39 (OD). When current having a polarity which is reverse to the current which deposits particles is applied so that a gold ion in the electrolytic solution is deposited on a side of a metal electrode, from which the ion is eluted, a white reflection coefficient thereof is measured to be 0.15.
Evaluation of Display device Next, a side of an Au electrode, which is the counter electrode of the display device, is set to be positive, and a side of an ITO electrode, which is a display electrode of the display device, is set to be negative. When a direct current was allowed to flow between both electrodes with a constant current voltage of 1 V and current density of 0.1 mA/cm$^2$, a display electrode portion of the display device is colored to be red. Further, when the current is excessively flown, the display electrode portion is colored to be black. Subsequently, when the current is flown with reversed polarity, the red color is completely disappeared. Such coloration-decoloration operation is repeated $10^5$ times, and thereafter, the ITO electrode is set to be negative so that the display electrode portion is colored to be red.

When the red-color absorbance is measured by using a spectrophotometer (trade name: U-4000, described above), an absorbance peak thereof is about 520 nm, a peak half-value width thereof is 55 nm, and thus a color purity thereof is excellent. A white reflection coefficient of the background portion measured by using a reflection densitometer (MACBETH RD-918, described above) is 0.15 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800, described above). It is then found that the concentration of gold is 0.08 mmol/l.

Besides, the display device which is in a state of fully colored in red is decomposed. A surface of the display electrode portion thereof is then observed and measured by using an atom force microscope. It is found that metal fine particles are deposited on the surface of the ITO electrode. An average particle size of the metal fine particles is 43 nm, and a ratio of existence thereof is 467 pieces/μm². A calculation of Pp(±30)/Pp(T) thereof is conducted to confirm the value is about 0.36.

Example 4

Preparation of Display Device

A display medium having the constitution as shown in FIG. 1 is prepared in the procedures as described below.

Firstly, a transparent non-alkali glass substrate 10 (thickness: 1 mm, size: 10 cm×10 cm) on one side of which an ITO film (film thickness: 200 nm) is provided as a transparent electrode 11 as a display electrode, is prepared. An area of the display electrode portion is set to be 0.25 cm².

On the other hand, tetrabutyl ammonium bromide and sodium cyanide are dissolved in DMSO (dimethyl sulfoxide) as supporting electrolytes so that the concentration of the tetrabutyl ammonium bromide becomes 0.5 mol/l and that of the sodium cyanide becomes 0.1 mol/l. 100 parts by mass of the resultant solution is added with 120 parts by mass of titanium oxide and stirred so as to prepare an electrolytic solution 30.

Next, a spacer having a thickness of 100 μm is provided on an electrode-provided side of the transparent substrate 10 on which the transparent electrode 11 is provided. A non-alkali glass substrate 20 (thickness: 1 mm, size: 10 cm×10 cm), which has an electrode 21 which is a metallic electrode formed by spattering so as to have a thickness of 100 nm as a counter electrode, is stacked to the transparent substrate 10 so that respective electrodes face with each other. Subsequently, an entire periphery, except for one portion, of an end face of the thus obtained stacked body is sealed with an ultraviolet ray-curable resin (trade name: 3121, described above) and cured by irradiation of ultraviolet ray.

Further, the electrolytic solution 30 is filled in the stacked body from the portion of the end face of the laminate, which is not sealed with the resin (electrolytic solution-pouring inlet). After the filling, the electrolytic solution-pouring inlet is sealed with the ultraviolet ray-curable resin and cured by irradiation of ultraviolet ray so as to prepare a display device. When the device is observed from the display substrate side, the device looks white. A white reflection coefficient of the device measured by using a Macbeth densitometer (trade name: MACBETH RD-918, described above) is 0.15 (OD).

Evaluation of Display device

Next, a side of an Au electrode, which is the counter electrode of the display device, is set to be positive, and a side of an ITO electrode, which is a display electrode of the display device, is set to be negative. When a direct current was allowed to flow between both electrodes with a constant current voltage of 1 V and current density of 0.1 mA/cm², a display electrode portion of the display device is colored to be red. Further, when the current is excessively flown, the display electrode portion is colored to be black. Subsequently, when the current is flown with reversed polarity, the red color is completely disappeared. Such coloration-decoloration operation is repeated 10⁵ times, and thereafter, the ITO electrode is set to be negative so that the display electrode portion is colored to be red.

When the red-color absorbance is measured by using a spectrophotometer (trade name: U-4000, described above), an absorbance peak thereof is about 520 nm, a peak half-value width thereof is 55 nm, and thus a color purity thereof is excellent. A white reflection coefficient of the background portion measured by using a reflection densitometer (MACBETH RD-918, described above) is 0.15 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800, described above). It is then found that the concentration of gold is 0.08 mmol/l. The concentration is determined by a calibration curve formed prior to the measurement.

Besides, the display device which is in a state of fully colored in red is decomposed. A surface of the display electrode portion thereof is then observed and measured by using an atom force microscope. It is found that gold metal fine particles are deposited on the surface of the ITO electrode. An average particle size of the metal fine particles is 10 nm, and a ratio of existence thereof is 503 pieces/μ². A calculation of Pp(±30)/Pp(T) thereof is conducted to confirm the value is about 0.42.

Comparative Example 1

Preparation of Display Device

Chloroauric acid is dissolved in DMSO (dimethyl sulfoxide) so that the concentration thereof becomes 0.5 mol/l. 100 parts by mass of the resultant solution is added with 120 parts by mass of titanium oxide and stirred so as to prepare an electrolytic solution. A display device of Comparative example 1 is prepared in the same manner as in Example 1 except that the thus obtained electrolytic solution is used in place of the electrolytic solution 30.

When the device is observed from the display substrate side, the device looks slightly-yellow white. A white reflection coefficient of the device measured by using a Macbeth densitometer (trade name: MACBETH RD-918, described above) is 0.39 (OD).

Evaluation of Display device

Evaluations for the display device of Comparative example 1 are carried out in the same manner as in Example 1. A coloration of a display electrode portion of the display device of Comparative example 1 in the former stage is slightly-black red.

Subsequently, when the coloration-decoloration operation is repeated 10⁵ times, a coloration of the display electrode portion of the display device of Example 2 is red which is similar to that in the former stage.

When the red-color absorbance is measured by using a spectrophotometer (trade name: U-4000, described above), an absorbance peak thereof is about 520 nm, and a peak half-value width thereof is 100 nm, thus a color purity thereof is not recognized as preferable. A white reflection coefficient of the background portion measured by using a reflection densitometer (MACBETH RD-918, described above) is 0.42 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800; manufactured by Shimadzu Corporation). It is then found that the concentration of copper is 250 mmol/l. The concentration is determined by a calibration curve formed prior to the measurement.

Besides, the display device which is in a state of fully colored in red is decomposed. A surface of the display electrode portion thereof is then observed and measured by using an atom force microscope. It is found that gold metal fine particles are deposited on the surface of the ITO electrode. An average particle size of the metal fine particles is 10 nm. A calculation of Pp(±30)/Pp(T) thereof is conducted to confirm the value is about 0.39.

Comparative Example 2

Preparation of Display Device

Copper bromide and sodium bromide are dissolved in DMSO (dimethyl sulfoxide) as supporting electrolytes so that the concentration of the copper bromide becomes 0.5 mol/l and that of the sodium bromide becomes 0.6 mol/l. 100 parts by mass of the resultant solution is added with 120 parts by mass of titanium oxide and stirred so as to prepare an electrolytic solution. A display device of Comparative example 2 is prepared in the same manner as in Example 1 except that the thus obtained electrolytic solution is used in place of the electrolytic solution 30.

When the device is observed from the display substrate side, the device looks slightly-white violet. A white reflection coefficient of the device measured by using a Macbeth densitometer (trade name: MACBETH RD-918, described above) is 0.40 (OD).
Evaluation of Display device Evaluations for the display device of Comparative example 2 are carried out in the same manner as in Example 1. A coloration of a display electrode portion of the display device of Comparative example 2 in the former stage is gray.

Subsequently, when the coloration-decoloration operation is repeated $10^5$ times, a coloration of the display electrode portion of the display device of Comparative example 2 is gray which is similar to that in the former stage. The gray color, which is different from the desired red color, is apparently caused by mixing of a color of the electrolytic solution. A white reflection coefficient of the background portion measured by using a reflection densitometer (MACBETH RD-918, described above) is 0.43 (OD).

Next, one portion of the electrolytic solution is taken out by breaking the electrolytic solution-pouring inlet while the display device in the display state. The thus obtained electrolytic solution is analyzed under conditions of an X-ray tube voltage of 40 kV and a filament current of 70 mA by using an X-ray fluorescence analyzer (trade name: XRF-1800; manufactured by Shimadzu Corporation). It is then found that the concentration of copper is 300 mmol/l.

Besides, the display device which is in a state of fully colored in red is decomposed. A surface of the display electrode portion thereof is then observed and measured by using an atom force microscope. It is found that copper metal fine particles are deposited on the surface of the ITO electrode. An average particle size of the metal fine particles is 30 nm. A calculation of Pp(±30)/Pp(T) thereof is conducted to confirm the value is about 0.41.

As is shown the results of the evaluations, the display devices of the Examples of the invention, each of which is conditioned so that the concentration of the metal ion in the electrolytic solution is within the range defined in the invention, provides high white reflection coefficient of the background portion, high contrast between the background portion and an image portion, and high color purity in the image portion.

What is claimed is:
1. A display method for displaying an image by deposition of metal fine particles, the display method comprising:
depositing metal fine particles, from an electrolytic solution that comprises the metal ion of the metal particles and that is provided between a pair of substrates comprising at least one translucent substrate, onto a surface of any one of the pair of substrates by imparting one stimulus,
a concentration of the metal ion of the metal fine particles in the electrolytic solution after imparting the stimulus being about 200 mmol/l or less,
wherein
the electrolytic solution further comprises as a supporting electrolyte a salt that forms a complex with the metal ion, and
the supporting electrolyte comprises at least one selected from the group consisting of LiF, LiCl, LiI, LiCN, NaX in which X represents a fluorine atom, a chlorine atom, a bromine atom, an iodine atom or a CN, KX in which X represents a fluorine atom, a chlorine atom, a bromine atom, an iodine atom or a CN, and a halogenated quaternary ammonium salt.
2. The display method of claim 1, wherein the supporting electrolyte comprises at least one selected from a halide compound and a cyanide compound.
3. The display method of claim 1, wherein the metal ion comprises at least one selected from a gold ion and a copper ion.
4. The display method of claim 1, further comprising displaying another image by metal fine particle dissolution by dissolving at least some of, the metal fine particles deposited from the electrolytic solution into the electrolytic solution by imparting another stimulus.
5. The display method of claim 1, wherein the metal fine particles show color due to surface plasmon resonance.
6. The display method of claim 1, wherein the electrolytic solution further comprises a reflective material.
7. The display method according to claim 1, wherein at least one of the pair of substrates has a metal electrode on the surface thereof that is in contact with the electrolytic solution; and, by imparting the one stimulus, metal ions are eluted from the metal electrode on one of the substrates, and the metal fine particles are deposited on a surface of the other substrate.
8. The display method according to claim 7, wherein: the one stimulus is an application of a current; initially a current is applied having a polarity that is the reverse to that of the current which deposits the metal fine particles; and metal ions in the electrolytic solution are deposited in advance on the surface of the metal electrode from which metal ions are eluted by the one stimulus.
9. The display method of claim 1, wherein the halogenated quaternary ammonium salt is tetraalkyl quaternary ammonium bromide.
10. The display method of claim 1, wherein the supporting electrolyte comprises at least one cyanide compound.
11. The display method of claim 1, wherein the concentration of the metal ion of the metal fine particles in the electrolytic solution after imparting the stimulus is 0 mmol/L.
12. The display method of claim 1, wherein the concentration of the metal fine particles in the electrolytic solution after imparting the stimulus is 0.11 mmol/L or less.

* * * * *